United States Patent [19]

Schuster et al.

[11] Patent Number: 4,980,071
[45] Date of Patent: Dec. 25, 1990

[54] SUBSTITUTED THIOUREAS FOR THE SEPARATION OF COMPLEXLY BOUND HEAVY-METAL IONS

[75] Inventors: Michael Schuster; Karl-Heinz Koenig, both of Frankfurt; Hermann Lotter, Hainburg; Karlheinz Drauz, Freigericht, all of Fed. Rep. of Germany

[73] Assignee: Degussa Aktiengesellschaft, Fed. Rep. of Germany

[21] Appl. No.: 436,249

[22] Filed: Nov. 14, 1989

[30] Foreign Application Priority Data

Nov. 19, 1988 [DE] Fed. Rep. of Germany ....... 3839222

[51] Int. Cl.$^5$ ............................................. C02F 1/54
[52] U.S. Cl. .................................. 210/725; 210/729; 210/737; 210/912; 423/34; 423/101; 423/140
[58] Field of Search ................... 75/108; 723/34, 101, 723/140; 210/725, 727, 728, 729, 912-914, 737

[56] References Cited

U.S. PATENT DOCUMENTS

| | | | |
|---|---|---|---|
| 3,994,719 | 11/1976 | Corte et al. | 423/22 |
| 4,087,359 | 5/1978 | Patron et al. | 210/719 |
| 4,172,784 | 10/1979 | Knoree et al. | 219/912 |
| 4,256,227 | 3/1981 | Petrovich | 209/166 |
| 4,571,265 | 2/1986 | Konig et al. | 210/725 |
| 4,731,187 | 3/1988 | Moriya et al. | 210/913 |
| 4,822,496 | 4/1989 | Griffiths | 210/721 |

FOREIGN PATENT DOCUMENTS 2608153 9/1977 Fed. Rep. of Germany ...... 210/724

*Primary Examiner*—Peter Hruskoci
*Attorney, Agent, or Firm*—Beveridge, DeGrandi & Weilacher

[57] ABSTRACT

Heavy metals can be precipitated from waste water or aqueous reaction solutions containing inorganic and/or organic complexing agents with substituted thiorureas of the general formula $R_1R_2N\text{-}CS\text{-}NH\text{-}COR_3$. N,N-dialkyl-N'-benzoyl thioureas are used with preference, whereby methyl, ethyl, n-propyl or isobutyl groups are used as alkyl substituents.

3 Claims, No Drawings

SUBSTITUTED THIOUREAS FOR THE SEPARATION OF COMPLEXLY BOUND HEAVY-METAL IONS

INTRODUCTION AND BACKGROUND

The present invention relates to the use of substituted thioureas for the separation of complexly bound heavy-metal ions from reaction solutions and waste water containing inorganic and/or organic complexing agents such as ammonia, amines, diamines, amino acids or hydroxy acids.

Due to their toxicity, heavy metals must be separated from waste water and reaction solutions down to residual concentrations of a few milligrams per liter. This normally occurs by means of neutralization with sodium hydroxide solution, soda or milk of lime. Slightly soluble metal hydroxides or metal carbonates form thereby which can be removed by sedimentation or filtration. If complexing agents are present in the solutions, this method fails. Here in the latter instance, other techniques are used such as overalkalization, electrolysis, metal-sulfide precipitation with hydrogen sulfide or the use of trimercapto-S-triazine-trisodium salt solution (TMT 15).

These methods have the disadvantage that they are in part very complicated and expensive, do not achieve high depletion rates or do not result in certain areas of utilization in readily filterable precipitates.

DE-PS No. 33 40 056 corresponding to U.S. Pat. No. 4,571,265, teaches a method for the separation and purification of platinum metals from the other noble and base metals from acidic solutions in which method substituted thioureas of the general formula $R_1R_2N$-CS-NH-$COR_3$ are used. However, these solutions do not contain complexing agents.

SUMMARY OF THE INVENTION

An object of the present invention is to provide a method for the separation of complexly bound heavy-metal ions from reaction solutions and waste water containing inorganic and/or organic complexing agents, especially amino acids or hydroxy acids, whereby high depletion rates and readily filterable, crystalline precipitates are obtained in as simple a manner as possible.

In achieving the above and other objects, one feature of the invention is the treatment of such materials with substituted thioureas of the general formula:

$$R_1R_2N-CS-NH-COR_3$$

in which $R_1$, $R_2$, $R_3$ are the same or different substituted or unsubstituted alkyl, aryl and/or aralkyl groups and $R_1$ and $R_2$ also signify hydrogen at a pH between 1 and 10 and temperatures between 15° and 100° C.

It is advantageous to use N,N-dialkyl-N'-benzoyl thioureas, wherein methyl, ethyl, n-propyl or isobutyl groups are the alkyl groups. In addition, it is advantageous to use a pH between 5 and 9 and temperatures between 20° and 80° C.

These thioureas can be readily prepared from the corresponding secondary amines, benzoyl chloride and potassium thiocyanate by know methods A purification of the raw products, e.g. by recrystallization, is not necessary.

Complex bound heavy metals can be recomplexed with the thiourea compounds and subsequently precipitated out of the aqueous, neutral or weakly acidic or weakly basic solution by adding the solid thiourea compound or a solution thereof in e.g. sodium hydroxide solution, potash lye or milk of lime.

These thioureas are slightly soluble in water or diluted acids.

The precipitation agent is added in an excess. The metal complex created is slightly soluble in aqueous solution and forms a crystalline, readily filterable precipitate.

The following table shows the optimum pH ranges for a precipitation of the metal chelates for a few heavy metals.

| Metal | pH range of the precipitation |
|---|---|
| $Tl^{1+}$ | 8–9 |
| $Pb^{2+}$, $Ni^{2+}$, $Zn^{2+}$ | 5–7 |
| $Co^{2+}$, $Cd^{2+}$ | 7–8 |
| $Cu^{2+}$, $Hg^{2+}$ | 2–6 |

The separated precipitate—a mixture of heavy metal —thiourea complex and excess thiourea—can be completely removed or worked up by annealing. Copper complex can also be decomposed by digesting the precipitate in 3 molar sulfuric acid. The undissolved thiourea can be filtered off and recycled.

The free thiourea can be dissolved from complex mixtures containing e.g. cobalt, nickel or copper by digesting the precipitate in lye and can be precipitated after acidification of the filtrate to pH 6.

The low water-solubility of the thiourea compounds and their heavy metal—thiourea complexes makes possible the simple isolation of the inorganic and/or organic salts and compounds contained in the filtrate.

DETAILED EMBODIMENTS OF THE INVENTION

The following examples are intended to explain the method of the invention in more detail:

EXAMPLE 1

1 liter of an aqueous reaction solution with 58 g acetyl methionine, 1.6 g methionine, 5.3 g dipeptide, 120 g acetic acid and 115 mg cobalt (II) is adjusted with concentrated sodium hydroxide solution to pH 7. The solution is heated to 70° C. and mixed under vigorous agitation with 15 ml of a solution of 3 g N,N-diethyl-N'-benzoyl thiourea (DEBT) in 1N sodium hydroxide solution or with 3 g solid DEBT. The final pH should be between 7 and 8. After 30 min. agitation at 70° C., a pH of 6-6.5 is adjusted and the reaction mixture cooled down to 20° C. The precipitate of Co (DEBT)$_2$ and excess DEBT is filtered off. The precipitate is coarse-grained and readily filterable.

Residual cobalt concentration of the filtrate: 3–5 ml (AAS measurement after $H_2O_2/H_2SO_4$ digestion 35 % of the amount of DEBT added can be recycled by digesting the precipitate in 1N sodium hydroxide solution.

Concentration by evaporation and acidification of the filtrate to pH 1.8 yields acetyl methionine after filtration with a content of <10 mg/kg DEBT.

EXAMPLE 2

1 liter of the amino acid solution described in example 1 is adjusted to pH 7 under agitation with concentrated sodium hydroxide solution. After the addition of 5 g N,N-dimethyl-N'-benzoyl thiourea, the suspension is heated under vigorous agitation 3 h to 75° C., cooled down to 20° C. and filtered. The precipitate is coarse-grained and readily filterable.

Residual cobalt concentration of the filtrate: 2.5 mg/liter (AAS measurement after $H_2O_2/H_2SO_4$ digestion).

EXAMPLE 3

1 liter of an aqueous reaction solution with 173 g acetyl valine, 25.5 g valine and 88 mg cobalt (II) is adjusted under agitation with concentrated sodium hydroxide solution to pH 7.

After the addition of 10 g N,N-dibutyl-N'-benzoyl thiourea, the suspension is heated under vigorous agitation 3 h to 75° C., cooled down to 20° C. and filtered. The precipitate is coarse-grained and readily filterable.

Residual cobalt concentration of the filtrate: 10 mg/liter (AAS measurement after $H_2O_2/H_2SO_4$ digestion).

EXAMPLE 4

1 liter of a weakly acidic, aqueous reaction solution with 5 g methionine, 15 g sodium chloride and 100 mg/liter copper (II) is heated to 60° C. and compounded under vigorous agitation with 6 ml of a solution of 1.1 g N,N-diethyl-N'-benzoyl thiourea DEBT) in 1N sodium hydroxide solution or with 1.1 g solid DEBT.

The final pH should be between 5 and 6.5.

After 30 min. agitation at 60° C. under monitoring of the pH, the reaction mixture is allowed to cool down to 20° C.

The precipitate of Cu (DEBT)$_2$ and excess DEBT is separated. The precipitate is coarse-grained and readily filterable.

Residual copper concentration of the filtrate <1 mg/liter. (AAS measurement after $H_2O_2/H_2SO_4$ digestion.)

EXAMPLE 5

1 liter of an aqueous reaction solution with 10 g tartaric acid and 1 g nickel (II) is adjusted under agitation with concentrated sodium hydroxide solution to pH 7–8.

The solution is heated to 70° C. and mixed under vigorous agitation with 10 g solid DEBT or 50 ml of a solution of 10 g DEBT in 1 N sodium hydroxide solution After 30 min agitation at 70° C. under monitoring of the pH (pH≧6), the reaction mixture is allowed to cool down to 20° C. The coarse-grained and readily filterable precipitate of Ni (DEBT)$_2$ and excess DEBT is separated.

Residual nickel concentration of the filtrate ≦0.3 mg/liter (AAS measurement after $H_2O_2/H_2SO_4$ digestion).

EXAMPLE 6

1 liter of an aqueous reaction solution with 10 g tartaric acid, 50 g sodium bromide and 1 g nickel (II) is adjusted under agitation with concentrated sodium hydroxide solution to pH 7–8. The further reaction takes place as described in example 5 except that the mixture is agitated 60 min. at 80° C. with monitoring of the pH (pH≧6).

Residual nickel concentration of the filtrate: 2–3 mg/liter (AAS measurement after $H_2O_2/H_2SO_4$ digestion).

EXAMPLE 7

1 liter of an aqueous reaction solution with 20 g tartaric acid, 0.3 g nickel (II), 0.3 g copper (II) and 0.3 g zinc (II) is adjusted under agitation with concentrated sodium hydroxide solution to pH 8.

The solution is heated to 70° C. and mixed under vigorous agitation with 25 g solid DEBT. After 5 h agitation at 70° C., the reaction mixture is allowed to cool down to 20° C. The coarse-grained and readily filterable precipitate is separated.

Residual heavy-metal concentration of the filtrate:
0.5 mg/liter Ni
0.1 mg/liter Cu
0.05 mg/liter Zn
(AAS measurement after $H_2O_2/H_2SO_4$ digestion.)

EXAMPLE 8

1 liter of an aqueous reaction solution with 20 g ascorbic acid, 0.5 g cobalt (II) and 0.5 g nickel (II) is adjusted under agitation with concentrated sodium hydroxide solution to pH 7.

The further reaction takes place as described in example 7.

Residual heavy-metal concentration of the filtrate:
0.1 mg/liter Co
0.4 mg/liter Ni
(AAS measurement after $H_2O_2/H_2SO_4$ digestion.)

EXAMPLE 9

1 liter of an aqueous reaction solution with 20 g oxalic acid, 0.5 g cobalt (II) and 0.5 g nickel (II) is adjusted under agitation with concentrated sodium hydroxide solution to pH 7.

The further reaction takes place as described in example 7.

Residual heavy-metal concentration of the filtrate:
50 mg/liter Co
9 mg/liter Ni
(AAS measurement after $H_2O_2/H_2SO_4$ digestion.)

EXAMPLE 10

1 liter of an aqueous reaction solution with 20 g ammonium chloride, 0.3 g Zn (II), 0.3 g cadmium (II) and 0.3 g lead (II) is adjusted under agitation with concentrated sodium hydroxide solution to pH 7–8.

The further reaction takes place as described in example 7.

Residual heavy-metal concentration of the filtrate:
0.03 mg/liter Zn
0.1 mg/liter Cd
0.6 mg/liter Pb
(AAS measurement).

EXAMPLE 11

1 liter of the reaction solution described in example 10 is correspondingly reacted with 25 g solid N,N-dimethyl-N'-benzoyl thiourea.

Residual heavy-metal concentration of the filtrate:
0.05 mg/liter Zn
0.4 mg/liter Cd
0.5 mg/liter Pb
(AAS measurement).

Further variations and modifications of the invention will be apparent to those skilled in the art from the foregoing and are intended to be encompassed by the claims appended hereto.

We claim:

1. A process for the separation of complexly bound heavy-metal ions from reaction solutions and waste water containing organic and/or organic complexing agents, comprising contacting a liquid containing at least one inorganic or organic heavy metal containing complexing agent with a substituted thiourea of the formula:

$$R_1R_2N-CS-NH-COR_3$$

in which $R_1$ and $R_2$ are the same or different and are selected from the group consisting of hydrogen, substituted or unsubstituted alkyl, aryl and aralkyl and mixtures thereof and $R_3$ is a member selected from the group consisting of substituted or unsubstituted alkyl, aryl and aralkyl, at a pH between 5 and 10 and at a temperature between 15° and 100° C.; precipitating at least one heavy metal and separating said heavy metal from said liquid by filtration.

2. The process of claim 1 wherein N,N-dialkyl-N'-benzoyl thiourea is used wherein the alkyl group is selected from the group consisting of methyl, ethyl, n-propyl and isopropyl group and mixtures thereof.

3. The process of claim 1 wherein said pH is between 5 and 9 and said temperature is between 20° and 80° C.

* * * * *